United States Patent
Senarath et al.

(10) Patent No.: US 10,827,366 B2
(45) Date of Patent: Nov. 3, 2020

(54) SYSTEM AND METHODS FOR MONITORING PERFORMANCE OF SLICES

(71) Applicants: Nimal Gamini Senarath, Ottawa (CA); Hamidreza Farmanbar, Ottawa (CA); Hang Zhang, Nepean (CA); Xu Li, Nepean (CA)

(72) Inventors: Nimal Gamini Senarath, Ottawa (CA); Hamidreza Farmanbar, Ottawa (CA); Hang Zhang, Nepean (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 15/803,040

(22) Filed: Nov. 3, 2017

(65) Prior Publication Data

US 2018/0132117 A1 May 10, 2018

Related U.S. Application Data

(60) Provisional application No. 62/418,463, filed on Nov. 7, 2016.

(51) Int. Cl.
*H04W 24/02* (2009.01)
*H04L 12/26* (2006.01)
(Continued)

(52) U.S. Cl.
CPC ......... *H04W 24/02* (2013.01); *G06F 11/3006* (2013.01); *G06F 11/3466* (2013.01);
(Continued)

(58) Field of Classification Search
CPC . H04L 63/065; H04L 63/104; H04L 63/0435; H04L 41/28; H04L 41/0893; H04L 41/0896
See application file for complete search history.

(56) References Cited

U.S. PATENT DOCUMENTS

| 7,844,709 B2 * | 11/2010 | Aman | G06F 9/5077 709/226 |
| 2005/0039183 A1 * | 2/2005 | Romero | G06F 9/5061 718/100 |

(Continued)

FOREIGN PATENT DOCUMENTS

| CN | 105580413 A | 5/2016 |
| WO | 2009022966 A1 | 2/2009 |

(Continued)

OTHER PUBLICATIONS

International Search Report dated Jan. 31, 2018 for corresponding International Application No. PCT/CN2017/109562 filed Nov. 6, 2017.

(Continued)

*Primary Examiner* — Yves Dalencourt (57) ABSTRACT

Embodiments provide systems and methods for managing resources in networks which utilize network slicing. Embodiments include systems and methods for monitoring performance in networks which utilize network slicing when the resources of a network domain are allocated to more than one slice. Embodiments include systems and methods for monitoring performance when resources of a slice are controlled by different network operators/service providers. A domain manager can make the performance measurement data available per network allotment instance with an identifier indicating to which virtual network service the performance measurement data belongs.

24 Claims, 6 Drawing Sheets

(51) Int. Cl.
    *H04L 12/24*    (2006.01)
    *H04L 29/08*    (2006.01)
    *G06F 11/30*    (2006.01)
    *G06F 11/34*    (2006.01)

(52) U.S. Cl.
    CPC ...... *H04L 41/5009* (2013.01); *H04L 41/5019* (2013.01); *H04L 43/026* (2013.01); *H04L 43/04* (2013.01); *H04L 67/322* (2013.01); *H04L 67/34* (2013.01); *H04L 41/044* (2013.01); *H04L 41/0893* (2013.01)

(56) References Cited

U.S. PATENT DOCUMENTS

| 2009/0049152 | A1  | 2/2009  | Rimhagen et al. |
| 2014/0087716 | A1  | 3/2014  | Vaderna et al. |
| 2016/0105346 | A1* | 4/2016  | Pignataro ............... H04L 63/104 370/253 |
| 2016/0105819 | A1  | 4/2016  | Andrianov et al. |
| 2016/0277308 | A1* | 9/2016  | Challa .................... H04L 67/42 |
| 2017/0331670 | A1* | 11/2017 | Parkvall ............ H04W 52/0274 |

FOREIGN PATENT DOCUMENTS

| WO | 2009072941 | A1 | 6/2009 |
| WO | 2015077385 | A2 | 5/2015 |

OTHER PUBLICATIONS

Huth Hans-Peter et al: "Resource-aware virtualization for industrial networks:A novel architecture combining resource management, policy control and network virtualization for networks in automation orsupervisory control and data acquisition networks", 2013International Conference on Data Communication Networking (DCNET), Scitepress, Jul. 29, 2013, pp. 1-7, XP033209105.

3GPP TS 23.799 V1.0.0 (Sep. 2016); Study on Architecture for Next Generation System (Release 14).

3GPP TR 21.905 V13.1.0 (Jun. 2016); Vocabulary for 3GPP Specifications (Release 13).

3GPP TR 32.101 V13.0.0 (Jan. 2016); Principles and high level requirements (Release 13).

* cited by examiner

SYSTEM AND METHODS FOR MONITORING PERFORMANCE OF SLICES

CROSS-REFERENCE TO RELATED APPLICATION

This application claims priority to U.S. Provisional Patent Application No. 62/418,463 entitled "SYSTEM AND METHODS FOR MONITORING PERFORMANCE OF SLICES" filed Nov. 7, 2016, the entire contents of which are incorporated herein by reference.

FIELD OF THE INVENTION

The present invention pertains to the field of communication networks. More particularly the application relates to the management of resources allocated to services within network slices.

BACKGROUND

Communication networks enabled by technologies such as Network Function Virtualization (NFV), Software Defined Networking (SDN), and Software Defined Topology (SDT), may be flexibly organized so as to service various customer demands. In building advanced networks, such as those to support future developments in wireless networks (including next generation wireless, or 5th generation networks), network slicing provides the ability to create isolated virtual networks that can be used to independently manage different traffic flows over a network. However, managing variable and competing demands on a potentially large network scale is a complex proposition requiring an effective architecture and management thereof.

Hierarchical arrangements of network management entities is known in the field. Network management entities responsible for the management of slices, have typically been designed with the view that the resources within a single domain are dedicated to a single slice. Consideration has typically not been directed to how resources within a single domain should be managed when the resources of the domain are allocated to more than one slice, let alone more than one slice with different network operators/service providers.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments provide systems and methods for managing resources in networks which utilize network slicing. Embodiments include systems and methods for monitoring performance in networks which utilize network slicing when the resources of a network domain are allocated to more than one slice. Embodiments include systems and methods for monitoring performance when resources of a slice are controlled by different network operators/service providers.

In the case where a slice instance is shared among multiple VN services, a domain manager (DM) can collect performance data which can be segregated for each VN service using that network allotment instance and provided to a network manager. This information could be provided on the basis of the performance of each VN service, or on the basis of the slice instance. The DM can make the performance measurement data available per network allotment instance with an identifier indicating to which virtual network service the performance measurement data belongs.

In some embodiments performance monitoring can include monitoring resource usage (computing, storage, transport, data storage, etc) at different levels. In some embodiments the monitored data can be collected and aggregated over the flows across services or slices.

One aspect of the disclosure provides a method of performance monitoring executed by a domain manager within a network which includes a plurality of domains and utilizes network slicing to provide network services. The method includes receiving performance data regarding flows from a plurality of network components within a domain for which the domain manager is responsible, with each flow being associated with a service. The method also includes transmitting performance data on an aggregated basis to a network manager which is associated with the plurality of domains, the performance data aggregated for the domain. In some embodiments transmitting performance data on an aggregated basis includes transmitting service differentiated aggregations such that the performance is aggregated on a service basis for the entire domain. In some embodiments the domain supports a plurality of slices, each slice managed by a slice operations manager, in which case transmitting performance data on an aggregated basis to a network manager includes transmitting performance data on an aggregated basis to each slice operations manager. In some such embodiments transmitting performance data on an aggregated basis to a network manager includes transmitting service differentiated aggregations on a service basis but segregated on a slice basis to each slice operations manager. In some such embodiments the service differentiated aggregations reports performance on a per service basis for each of a plurality of QoS levels. In some embodiments transmitting performance data on an aggregated basis includes transmitting performance aggregated on one of:
  a per service basis;
  a per QoS level basis;
  a per slice basis;
  a per service basis for each of a plurality of QoS levels;
  a per slice basis for each of a plurality of QoS levels;
  a per service-per slice basis; and
  a per service-per slice basis for each of a plurality of QoS levels.

In some embodiments the domain manager utilizes resources from another domain and transmitting performance data on an aggregated basis includes transmitting performance aggregated on a per domain basis. In some embodiments the method further includes receiving, from the network manager, configuration commands for configuring resources. In some embodiments the configuration commands instruct the configuration of a configuration manager for allocating resources. In some embodiments the configuration manager associated with the domain manager sends instructions to the element managers for configuring configuration managers associated with each element manager for allocating resources. In some embodiments the domain manager supports a plurality of slices and the method further includes sharing resources from one slice to another. In some embodiments transmitting performance data on an aggregated basis includes reporting multiplexing gains obtained from the sharing of resources. In some embodiments transmitting performance data on an aggregated basis includes transmitting aggregated service resource usage which differs from a simple addition of resource usage of individual flows due to multiplexing gain. In some embodiments transmitting performance data includes transmitting service differentiated aggregations for a slice to a slice operations manager responsible for operation of the slice. In some embodiments transmitting performance data on an aggregated basis includes transmitting performance aggregated on a per service-per slice basis for each slice. In some embodiments transmitting performance data on an aggregated basis includes transmitting performance aggregated on a per service-per slice basis aggregated over at least one of: per service class; and per slice type. In some embodiments network components includes at least one of subnetworks, data storages, network elements, physical network functions and virtual network functions. In some embodiments receiving performance data from a plurality of network components includes receiving performance data from a plurality of element managers which manage the network components. In some embodiments receiving performance data from a plurality of network components includes receiving performance data on at least one of:

a per flow basis;
    a per service basis;
    a QoS basis; and
    a slice basis.

Another aspect of the disclosure provides a method of performance monitoring executed by a slice operations manager within a network which includes a plurality of domains, with each domain being managed by a domain manager The method includes receiving performance data from a plurality of domain managers; and transmitting performance data on an aggregated basis to a network manager which is associated with the plurality of domains, the performance data aggregated for the slice managed by the slice operations manager. In some embodiments transmitting performance data on an aggregated basis includes transmitting service differentiated aggregations such that the performance is aggregated on a service basis for the entire slice.

Another aspect of the disclosure provides a domain manager including at least one network interface, a processor and machine readable memory. The machine readable memory stores machine readable instructions which when executed by the processor causes the domain manager to: receive performance data on a per flow basis from a plurality of network components within a domain for which the domain manager is responsible; and transmit performance data on an aggregated basis to a network manager which is associated with the plurality of domains, the performance data aggregated for the domain. In some embodiments the instructions causes the domain manager to transmit service differentiated aggregations such that the performance is aggregated on a service basis for the entire domain. In some embodiments the domain supports a plurality of slices, each slice managed by a slice operations manager, and wherein the instructions cause the domain manager to transmit service differentiated aggregations on a service basis but segregated on a slice basis to each slice operations manager. In some embodiments the service differentiated aggregations reports performance on a per service basis for each of a plurality of QoS levels. In some embodiments the instructions cause the domain manger to transmit performance data on an aggregated basis aggregated on one of:

a per service basis;
    a per QoS level basis;
    a per slice basis;
    a per service basis for each of a plurality of QoS levels;
    a per slice basis for each of a plurality of QoS levels;
    a per service-per slice basis; and
    a per service-per slice basis for each of a plurality of QoS levels.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Management of resources within a communications network allows for the resources to be used in an efficient manner. The efficient use of resources allows for additional traffic demands to be accommodated, and in scenarios in which the underlying resources are only leased by a service provider, can allow for the provision of services using the minimum required resources to reduce costs.

To ensure proper allocation of resources, a network management (NM) entity can be employed. In some embodiments, the NM may include a Slice Operations Management entity (S-Opt M). In some embodiments, the function of the S-Opt M can be embodied in an entity distinct from the NM, while in others it can be incorporated within an NM. By having a distinct S-Opt M, different slices can be managed by different entities. In some embodiments the NM entity, in conjunction with the S-Opt-M entity can perform one or more of the following functions:

Supervise a Network Slice Instance;
    Monitor Performance of a Network Slice Instance;
    Upgrade a Network Slice Instance; and
    Uplift a Network Slice Instance.

Those skilled in the art will appreciate that upgrading a Network Slice Instance refers to performing a software upgrade on VNFs within the network slice, while uplifting a slice refers to adding a VNF to a slice for use by a service, or replacing an existing VNF with a new VNF within the slice. It should be understood that in situations in which there are a plurality of services operating within a single slice, both upgrading and uplifting must be performed with a degree of caution. If a VNF is to be upgraded, the NM and S-Opt-M should determine if there is a change in the operation of the function with the upgrade. Changes to the operation of a function may break existing services. If there is complete backwards compatibility between versions, the upgrade can be performed. If the upgrade will break some services but not others, two VNFs can be used to host the different versions, and the service function chain (SFC) of different services can be adjusted so that the correct version is used. When uplifting a slice instance, a new function can be added, and the service function chain of the service using the new function can be adjusted. If the uplifting includes replacing an existing function with another function, a similar process to the upgrade process should be employed, so that it can be determined whether the new function can replace the old function for all services. If the old function cannot be fully replaced for all services, the new function can be added as a new VNF, and the services that can employ the new function can have their SFCs adjusted.

Examples will be discussed which are primarily directed to Monitoring Performance of a Network Slice Instance when a network slice instance is shared by multiple service instances. A Domain Manager (DM) is utilized to manage the resources within a domain and to report to the NM entity and/or the S-Opt M entity.

When a slice instance uses a DM, there are several cases how the monitoring is performed by a DM and how the DM can provide feedback performance to the NM.

Case 1: A Slice is used exclusively for single service request/instance, and the DM is used by multiple slices:
  Case 1a: In this case DM has the capability to monitor slice specific performance and if the NM request to provide slice specific data (Performance Management (PM), Fault Management (FM), etc), the DM can send slice specific data to the NM with the corresponding slice instance ID.
  Case 1b: DM does not have the capability to monitor slice specific performance or NM has not requested separate slice specific data, the NM may provide overall performance of all the slices.

Case 2: A Slice is used for multiple service request/instances, and the DM is used by multiple slices:
  Case 2a: In this case the DM has the capability to monitor both slice specific performance, and service specific performance. In response to the NM requesting slice/service specific data (PM, FM, etc), the DM can send slice/service specific data to the NM with the corresponding slice instance ID.
  Case 2b: DM has the capability to monitor only at slice specific level (not service level) or NM has not requested separate service specific data. In this case the DM may provide overall performance of each slice instance to the NM.
  Case 2C: DM does not have the capability to monitor slice/service specific performance or NM has not requested separate slice/service specific data, the DM may provide overall performance of all the slices to NM.

Example network architectures will now be discussed which can be used to Monitor Performance of one or more Network Slice Instances for the above described use cases.

Figure 1:
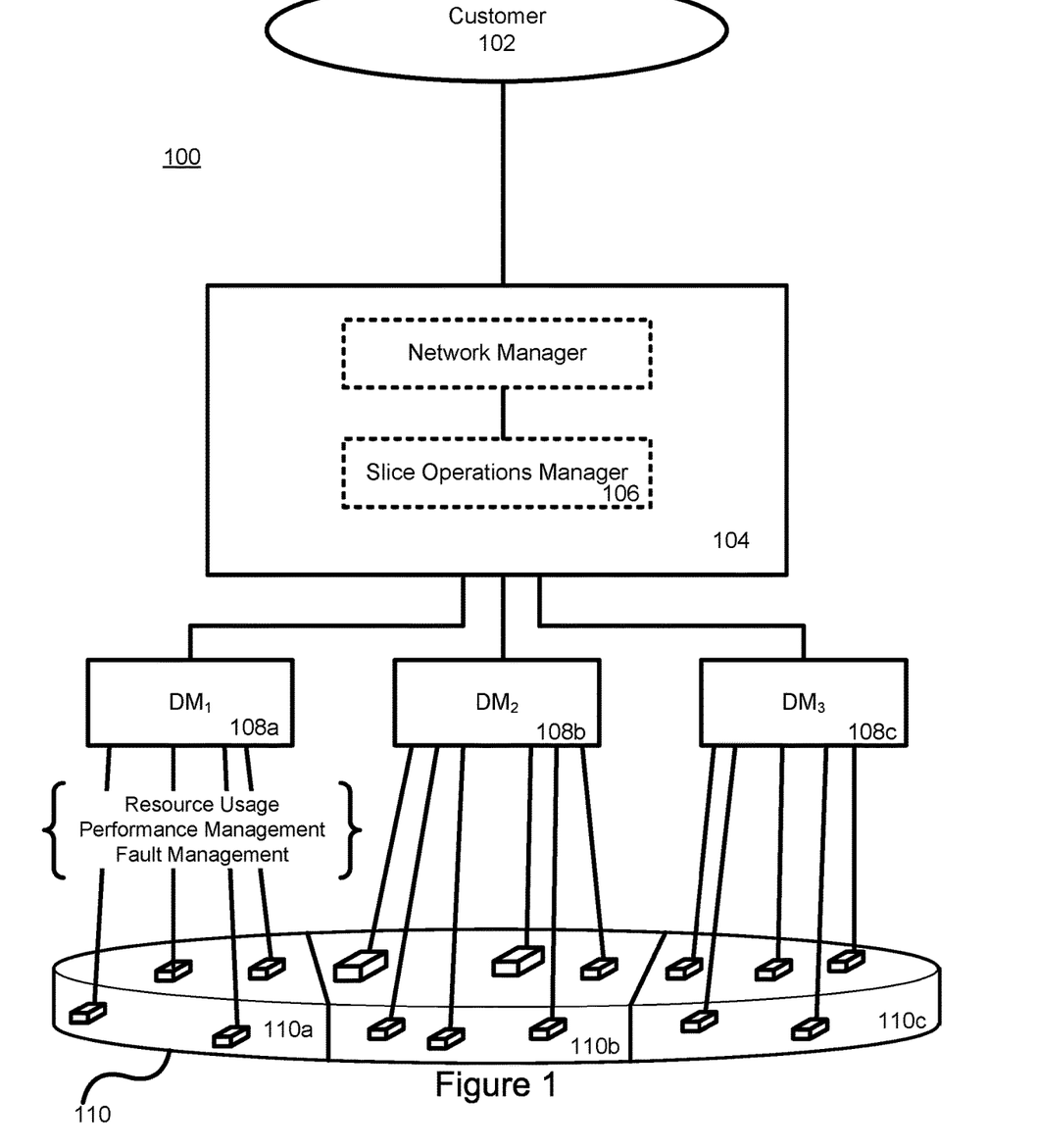
FIG. 1 illustrates an architecture for the management of resources in a sliced network environment.

FIG. 1 illustrates an architecture 100 for use in management of the resources within slices. As illustrated in FIG. 1, a customer 102 provides a set of service requirements to a network manager (NM) 104. The NM 104 may include a Slice Operations Manager (SOM) 106, or the NM 104 and SOM 106 could be distinct entities. Overall, the NM 104 and SOM 106 are responsible for ensuring that a slice 110 is created to serve the requirements provided by the customer 102. It should be understood that slice 110 may be the aggregation of resources from different domains. Each of these domains can have a domain manager 108 (108a-c), which is responsible for management of the resources within a portion (110a-c) of slice 110.

Each of the DMs 108a-c communicates with resources within their domain that are allocated to slice 110. This may be communication with an element manager (EM) or it may be communication directly with Network Functions (NFs) including physical network functions (PNFs) and/or virtual network functions (VNFs). It should also be understood that in some embodiments the functions carried out by the DM can be pushed down to the EMs or VNFs.

Because the resources under a DM 108 may exceed those allocated to slice 110, the DM may collect data from the resources allocated to slice 110, including performance management and fault management data to ensure that the requirements are being met. Additionally, information about resource usage can be collected. This allows the DM to determine the currently available resources. If there are a plurality of slices served by a DM, knowledge about the usage of resources across a plurality of slices allows the DM to support a degree of statistical multiplexing to allow the re-allocation of unused resources from one slice to another (on a temporary basis).

The DM can collect data, and provide aggregated data to the SOM or NM.

Figure 2:
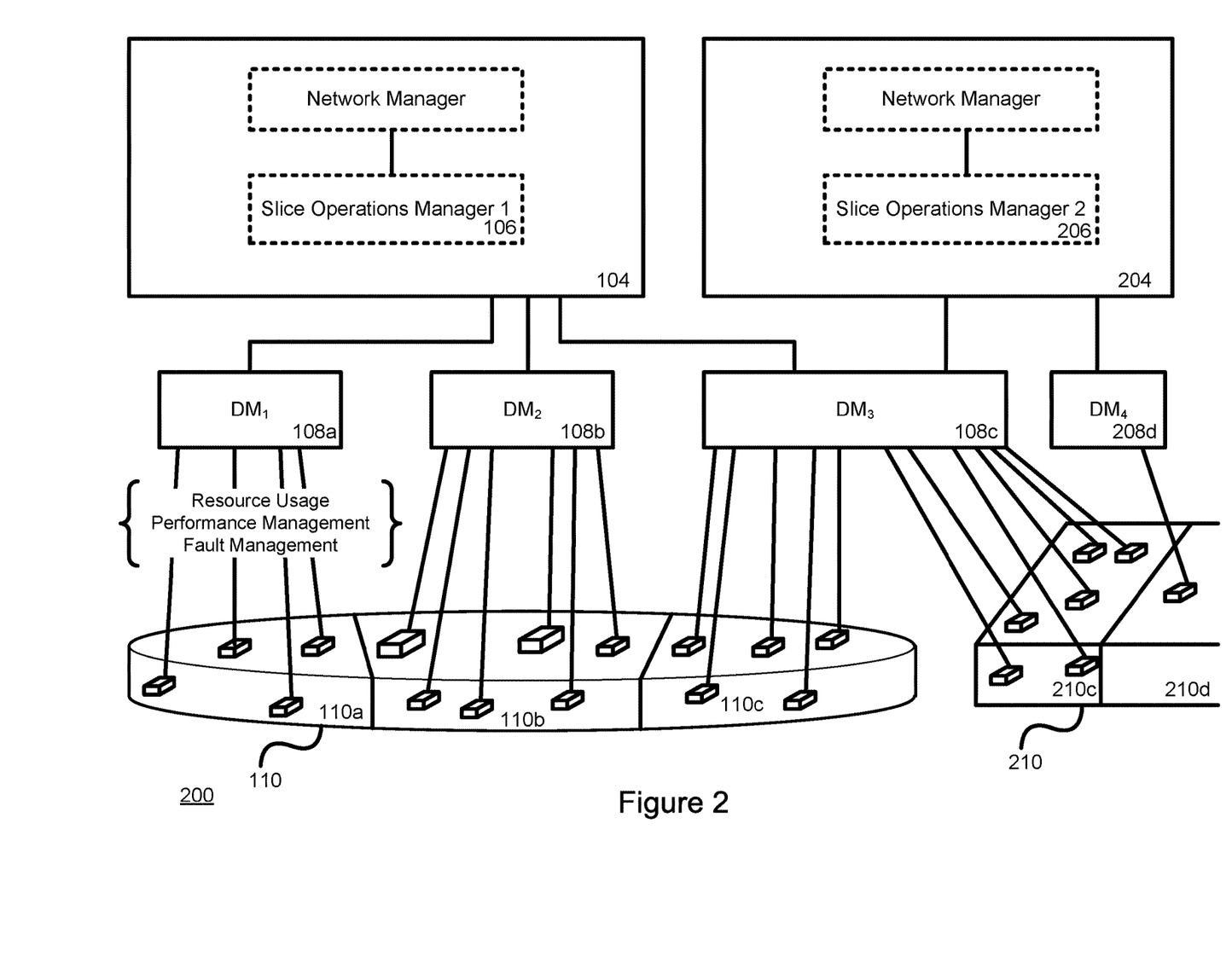
FIG. 2 illustrates an architecture for the management of resources in an environment where resources within a domain are allocated to slices operated by different network operators.

FIG. 2 illustrates an embodiment in which a DM, in this case $DM_3$ 108c, manages resources 110c, 210c, which are allocated to different slices (110 and 210 respectively). While slice 110 is associated with NM 104 and SOM1 106, slice 210 is associated with NM 204 and SOM2 106. Thus, $DM_3$ 108c is responsible for reporting on resources that are in different slices. There may be operational information about the slices that should not be sent to a SOM other than the SOM associated with the slice. To accomplish this, in one embodiment, instead of the DM providing information about resources on a per slice basis, the information can be provided on a per service basis. It will be recognized that each slice can be used to carry traffic for more than one service. Two services may have similar (or identical) characteristics, such as QoS requirements, but have differences such as where the data is transmitted, or who is billed for the traffic. The DM being able to provide performance metrics on a per-service basis allows the SOM to better identify information about traffic in the slice.

For DM3 108c which reports to two different SOMs (SOM1 106 and SOM2 206), information can be reported per service-per slice. If the DM has a listing of the services carried across its resources for each slice, it can filter the services according to the slice that they are carried in so that only the services present in slice 110 are reported to SOM1 106, and only the services present in slice 210 are reported to SOM2 206.

It should be understood that although the slices 110 and 210 are shown as distinct, this is only a logical representation. The functions within portions 110c and 210c may reside on the same compute resources, and the connections between them may make use of the same physical communication links. Separation of the performance metrics by slice may not be possible without adding additional tracking information to all data within each slice. By providing a per-service tracking at the level of the EM or VNF, the DM can then associate the service identifier with the slice that the service is a part of. This allows for an accurate mechanism to track performance metrics, as a per-service-per-slice tracking allows for finer granularity and an easier isolation of performance statistics.

Figure 3:
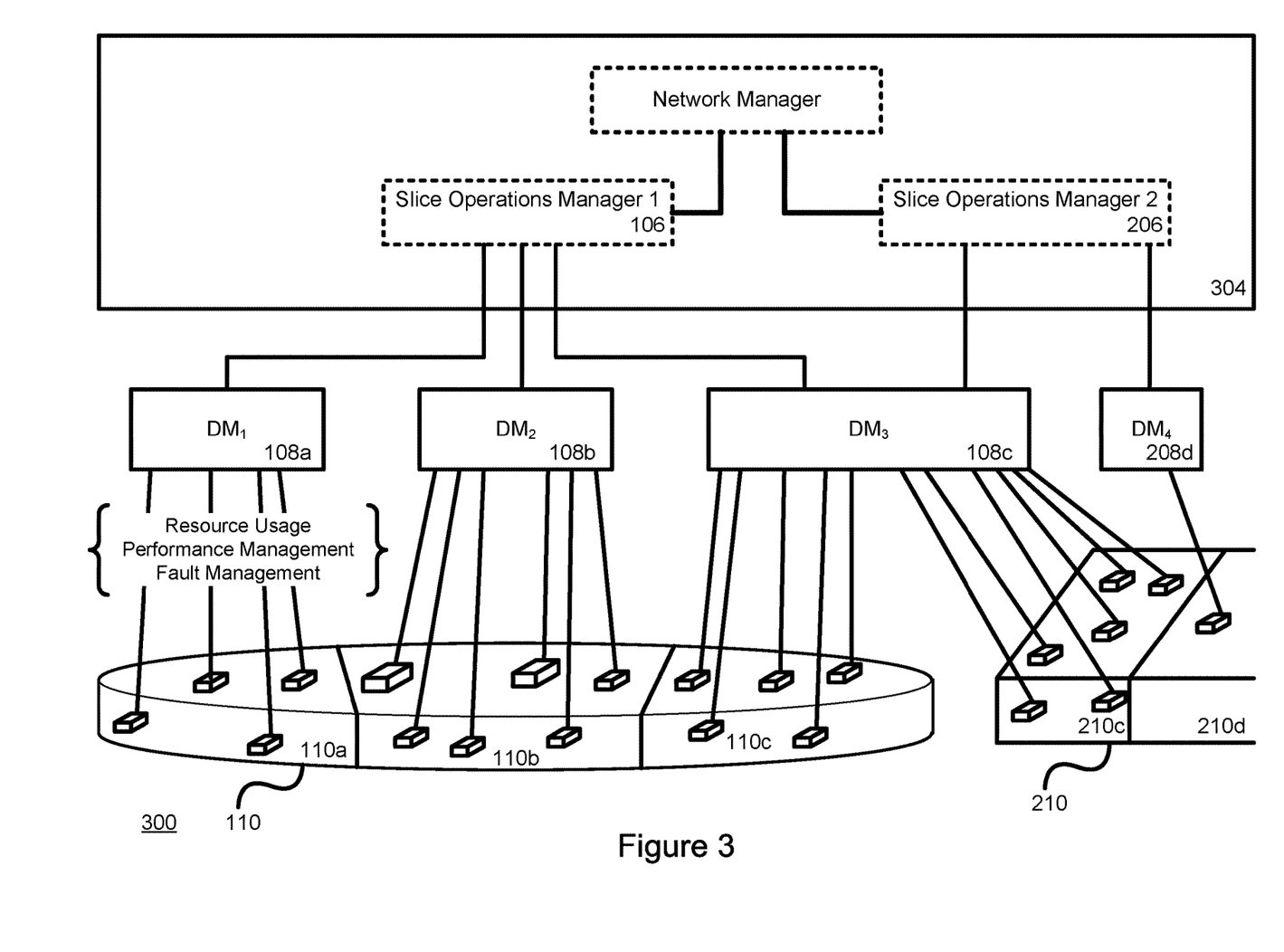
FIG. 3 illustrates an architecture for the management of resources in an environment where resources within a domain are allocated to a plurality of different slices.

FIG. 3 illustrates an architecture 300 similar to that of the architecture 200 in FIG. 2. However, SOM1 106 and SOM2 206 are both part of the same network, and slices 110 and 210 are distinct slices operated by the same service provider. Each slice is managed by a different SOM, and each DM can provide reports on a per-service-per-slice basis to ensure proper direction of reporting.

As will be apparent to those skilled in the art, FIG. 3 illustrates architecture 300, in which a network manager 304 includes two different slice operations managers, SOM 1 106 and SOM 2 206. As before, SOM 1 106 communicates with DM1 108a, DM2 108b, and DM3 108c. SOM 2 206 communicates with both DM3 108c and DM4 208d. Thus, SOM 1 106 and SOM 2 206 both communicate with DM3 108c. This allows SOM 1 106 to control the elements 110c of slice 110 which are a part of the third domain, and SOM 2 206 to control the elements 210c of slice 210 which are also a part of the third domain. As before, DM1 108a communicates with elements of a first domain 110a, DM2 108b communicates with elements of a second domain 110b, while DM4 208d communicates with elements of a third domain 210d. A first slice of network resources 110 is divided between three domains, 110a 110b and 110c. A second slice of network resources is divided between third and fourth domains 210c and 210d. The third domain includes resources 110c and 210c in both the first network slice 110 and the second network slice 210.

Accordingly, there can be more than one service per slice. In which case, services can be identified by service ID.

In some embodiments a DM can monitor traffic and resource utilization on a per service basis. In some embodiments a DM can aggregate performance across services. In some embodiments the NM aggregates across multiple domains.

For example, there can be multiple flows with the same QoS requirements. For example, there can be flows with QoS requirements $QoS_1$, $QoS_2$ and $QoS_3$. In some embodiments a DM can report QoS performance for each of the QoS flows ($QoS_1$, $QoS_2$ and $QoS_3$) over multiple slices (at least for portion with the domain managed by the DM). In some embodiments a DM can report across multiple services. For example, a DM can report of the $QoS_1$ flows for each service and for each slice within its domain. In some embodiments a DM can aggregate on a per slice and/or per service basis for each QoS level.

Accordingly an operator can use the methods and systems described herein to monitor the performance of the network slice to ensure SLA compliance for each virtual network (VN) service provided to each network customer. In such an example, each virtual network service is served using a network slice instance which is instantiated and configured by the NM. In some cases a network slice instance serves multiple VN services.

The NM can obtain performance data for each of the corresponding services. In some embodiments an operator can create a performance management job for the network functions in each network allotment instance. A network allotment instance can be dedicated to a network slice instance or can be shared by multiple network slice instances. In which case, a performance management job can include the selected counters, the granularity period and the reporting period. In some embodiments the DM makes the performance measurement data from a network allotment instance available to the NM on an ongoing basis, for example upon request. In some embodiments the DM can makes the performance measurement data from a network allotment instance available to the NM at the end of each reporting period.

In case of a shared network allotment instance the performance data is segregated per network slice instance that is using that shared network allotment instance. The DM makes the performance measurement data available per network allotment instance with an identifier indicating to which network slice instance the performance measurement data belongs.

In the case where a slice instance is shared among multiple VN services, the performance data can be segregated for each VN service using that network allotment instance and provided to the NM. This information could be provided on the basis of the performance of each VN service, or on the basis of the slice instance. The DM can make the performance measurement data available per network allotment instance with an identifier indicating to which virtual network service the performance measurement data belongs. As stated, as well as providing the segregated data, the DM can also aggregate as needed.

In some embodiments a DM can segregate the performance data separately for each service instance (if identified) and network slice.

When aggregated performance is requested for a 'network component' for a given network slice instance, DM can monitor the aggregated performance data of all the services using that network component and send that to the NM with the slice identity. A 'network component' can include sub-networks, data storages, PNFs and VNFs. In some embodiments the DM can do the same thing for other data (e.g. on a per flow basis). Note that in some embodiments the DM can report multiplexing gains obtained when sharing resources when aggregating data. In some embodiments the DM can monitor and report on aggregated performance data for all the slices of that network In some embodiments Performance monitoring can include monitoring resource usage (computing, storage, transport, data storage, etc) at different levels, including one or more of:

per each QoS flow in a service, individual flows in a particular service separately, aggregated over all the flows for a service, aggregated over all the services in a slice.

It can also be collected and aggregated over the flows across services or slices:

Aggregated across slice but per QoS class, or service class.

Aggregated over all the slices in a network manager, per QoS Class.

Aggregated across slice but per each service class/type.

Aggregated over all the slice instances in a network manager, per service class, etc.

Aggregated over all the slice instances of particular type in a network manager, etc.

In some embodiments performance monitoring can also include monitoring for Fault management or supervisory data including alarms created under certain conditions. Examples include alarm set for resource usage exceeding certain threshold.

Malfunction of a network element.

Power failures and battery conditions.

Temperature sensor, etc.

Embodiments can support creation and management of measurement jobs for the network functions in a dedicated network allotment or in a shared network allotment. In some embodiments this is consistent with 3GPP management systems. Further, some embodiments can support reception and handling of the performance measurement data from network slice instances. Further, some embodiments can support the grouping of performance measurement data per network allotment instance or per network slice instance.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 4:
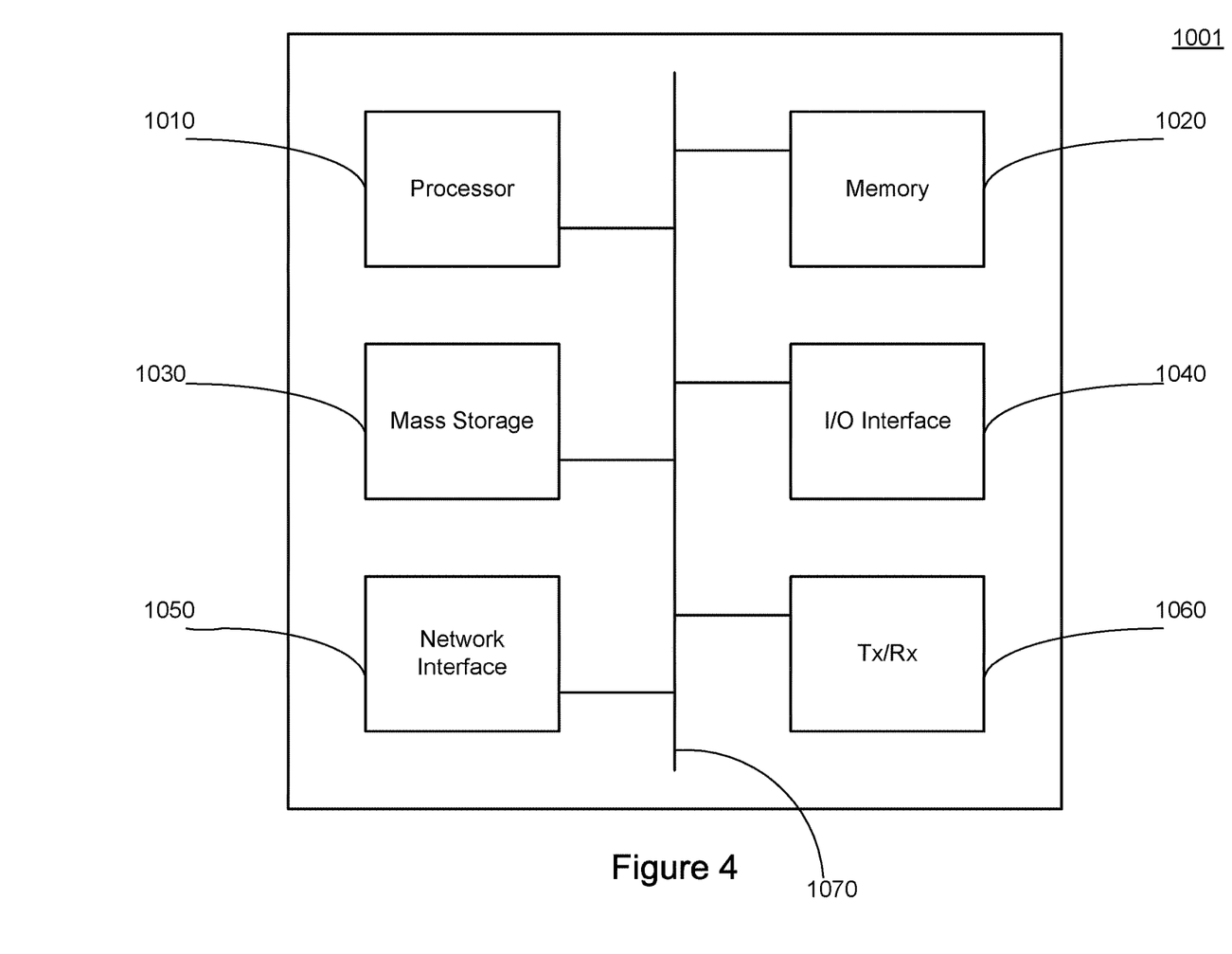
FIG. 4 is a block diagram of a processing system 1001 that may be used for implementing the various network functions, according to an embodiment.

FIG. 4 is a block diagram of a processing system 1001 that may be used for implementing the various network functions, including the DM, NM and SOM, according to an embodiment. As shown in FIG. 17, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1001 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1001 can be used to implement a node or host which executes the various network functions described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

An aspect of the disclosure provides a method of performance monitoring in a communications network. Such a method includes monitoring resource usage over a domain, and reporting per-service resource usage over the domain to a network manager. In some embodiments the monitoring is performed by a domain manager. In some embodiments the domain manager monitors resource usage on a per flow basis. In some embodiments the domain manager aggregates monitored resource usage across services. In some embodiments the domain manager can report Quality of Service (QoS) performance for each of a plurality of QoS flow types over multiple slices. In some embodiments the domain supports a plurality of slices, and the step of reporting includes reporting resource usage on a per-service-per-slice basis.

A subnetwork is a collection of network functions and associated resources. This can be arranged as a communication network to facilitate communication though the end points of this subnetwork. A domain is a network segment or infra-structure segment. The nature and extent of the network segment depends on the nature of the network and the device or devices used to interconnect end stations. A subnetwork can also be a network domain. Typically large networks are divided into domains or subnetworks to facilitate network management, with each subnetwork having its own administrative domain. Accordingly a network operator can subdivide a network into subnetworks to make the network more manageable. However in some cases each domain can be operated by separate legal entities. In this specification the terms domain and subnetwork are used interchangeably. Accordingly a domain manager is sometimes called a subnetwork manager.

An aspect of the disclosure provides a method of performance monitoring. The method is executed by a first network management function in a network hierarchy. Performance data is received from at least one of a plurality of network functions and network management functions, wherein each of the network functions or network management functions are below the first network management function in the network hierarchy. The first network management function transmits aggregated performance data to an entity above the first network function. The aggregated performance data can be aggregated a number of bases, depending on a number of factors, including where the first network management function resides in the network hierarchy.

Figure 5:
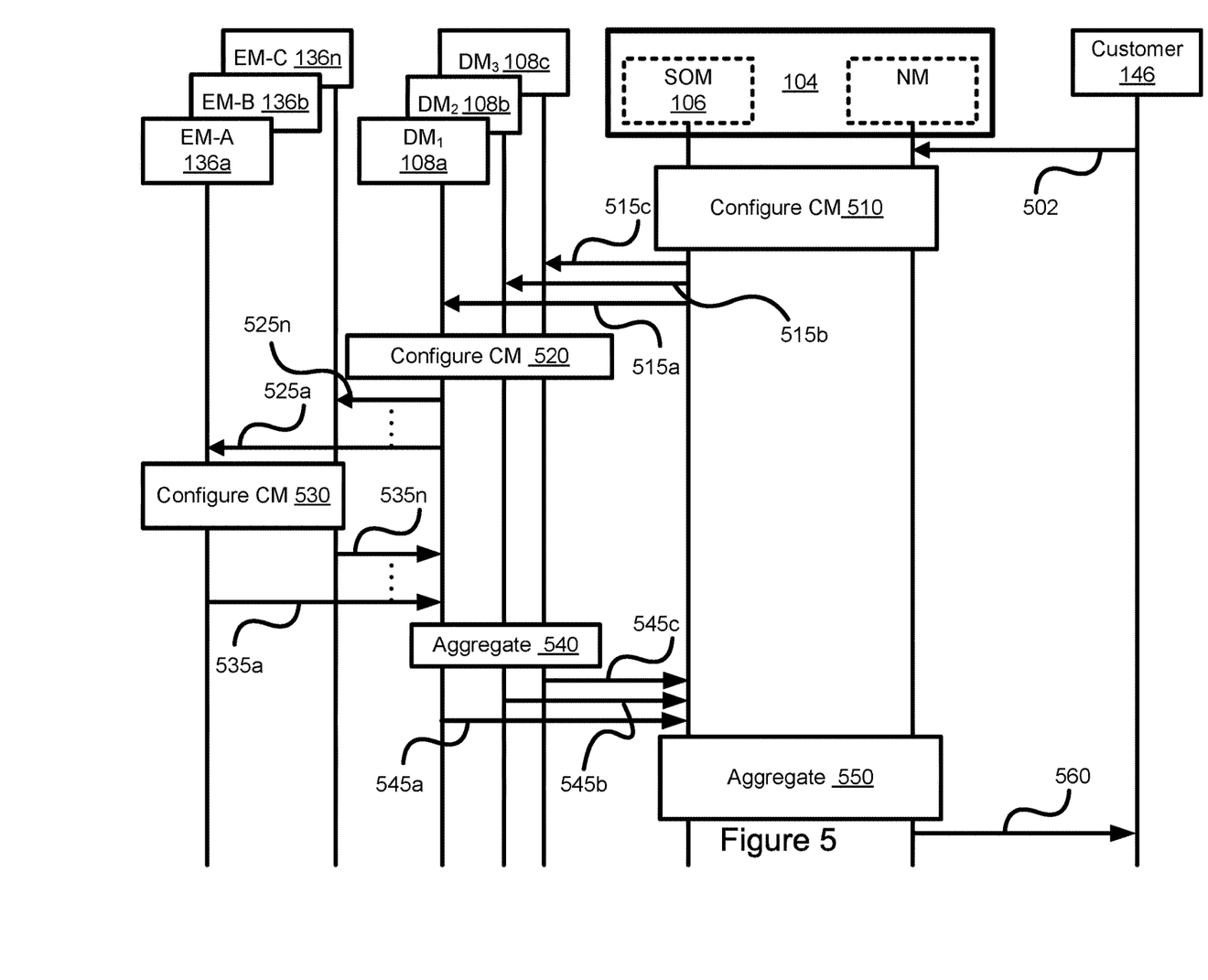
FIG. 5 is a call flow illustrating a method according to an embodiment.

An aspect of the disclosure provides a method of performance monitoring. FIG. 5 illustrates call flows for such a method, according to an embodiment. FIG. 5 will be discussed with reference to a hierarchical network architecture illustrated in FIG. 1, in which a plurality of domains provide and manage network components which can be allocated to slices. Accordingly a slice can span multiple domains, with each domain provided with a domain manager. Each slice is operated by an SOM. It should be appreciated that the SOM and S-Opt M are used interchangeably herein.

In FIG. 5 a network customer 146 sends a request 502 to a network manager 104. In some embodiments, the request can be for a virtual network service. In some cases the request 502 can request multiple virtual network services. In some embodiments, the request for each virtual network service can specify a QoS class, or set out a number of QoS levels for the virtual network service. It is noted that QoS class and QoS level are used interchangeably herein. In some embodiments, the request can specify a service class. Services can be classified by service class (also called service type) which identifies the services that have some common characteristic(s) (e.g. A QoS class, or a range of QoS levels, or same application such as consumer Internet Of Things (cIOT), enhanced Mobile BroadBand (eMBB) or Ultra Reliable Low Latency Communication (URLLC)). In some embodiments the virtual network service can be provided by establishing a network slice for the virtual network service. In some cases the requested virtual network service can be provided using an existing network slice capable of supporting more than one service. The NM 104 receives the request and configures the SOM 106 for operating the slice. This can include instantiating the SOM 106, if SOM 106 is not already instantiated, and configuring 510 the SOM 106. In some embodiments, the configuring step 510 can include configuring a Configuration Manager (CM) within the SOM 106. As previously discussed in some embodiments the SOM 106 can be a separate entity distinct from the NM 104, while in others it can be incorporated within the NM 104.

SOM 106, or in some cases the CM configured within SOM 106, then sends configuration messages 515a, 515b and 515c to each domain manager 108a, 108b and 108c whose domain is spanned by the slice managed by the SOM 106. Configuration messages 515a, 515b and 515c include instructions for configuring 520 each domain manager 108a, 108b and 108c to allocate the appropriate resources for to the slice. In some embodiments, the configuring step 520 can include configuring a Configuration Manager (CM) within each domain manager 108a, 108b and 108c.

Each domain manager 108a, 108b and 108c, or in some cases the CM configured within each domain manager 108a, 108b and 108c, then sends configuration messages 525a, . . . 525n to each element manager 136a . . . 136n within a domain for which the domain manager is responsible. It should be appreciated that each domain may include a number ($n_1$ $n_2$ and $n_3$) of EMs, but to avoid cluttering the figure, only the n EMs 136a . . . 136n under supervision of $DM_1$ 108a are shown. It should be appreciated that there need not necessarily be a one-to-one correspondence between the EMs 136a . . . 136n and the network components within the domain 110a of FIG. 1, as in some embodiments an EM can manage more than one network component. As stated above, the term 'network component' can include subnetworks, data storages, PNFs and VNFs. A network component can also be a network element, which can include PNFs or include the hardware in which VNFs are instantiated. Accordingly, in some embodiments the EM manages network elements in which network functions are instantiated.

Configuration messages 525a, . . . 525n include instructions to each element manager 136a . . . 136n for configuring 530 the respective element manager 136a . . . 136n to allocate resources to the requesting DM In some embodiments, the configuring step 530 can include configuring a Configuration Manager (CM) within each EM. It should be appreciated that each domain manager 108a, 108b and 108c can send $n_1$ $n_2$ and $n_3$ messages respectively.

Each of the CMs are responsible for allocating resources and configuring them to be used for a specific slice or service. The CMs within each EM are responsible for allocating resources on a network component basis, and for configuring each network component accordingly. In some embodiments each network component is allocated to multiple services by a CM which manages the network component. The CM also configures the network component as to what basis the network component should report (e.g. report on a flow basis, or slice basis, or service basis) and as to what information to be reported (e.g. service ID or Slice ID for each flow. The CM also can configure the policies a certain network function or network element should follow when providing communication services. The CM can also configure each network component to provide and report compliance with a specified QoS level. The CMs within the DMs are responsible for allocating resources on a domain basis, and for configuring the CMs within each EM accordingly. The CM within the SOM is responsible for allocating resources on a slice basis, and for configuring the CMs within each DM according to the slice requirements.

It should be appreciated that in some embodiments, the DM and EM functions can be combined for some networks, such a RAN, For example, in a RAN, the DM and EM functions can be combined in a single function which manages the RAN resources for a domain.

Each EM sends performance reports to its responsible domain manager. Examples will be discussed with reference to resource usage, but it should be understood that performance reports can also provide information regarding fault management, traffic load, QoS, etc. Accordingly, performance data/reports can include fault management data, service performance data, service traffic load data, QoS data, KPI data (such as QoS), data rate statistics, as well as data regarding the usage of network resources (such as computing, storage, transport, data storage). For each element manager 136a . . . 136n sends EM performance reports 535a . . . 535n to the $DM_1$ 108a. Each EM can send performance reports on at least one of a per flow basis, a per service basis, a QoS basis and a slice basis (assuming multiple slices use the EM). Further the EMs are configured to monitor performance on one or more of the above described bases by the DM as part of the above described configuration procedure. In some embodiments, when the performance data includes information regarding faults, the performance data can also include alarms. A fault or alarm can be related to a particular network element or network function, and the EM can identify the network element or network function when providing the performance report.

It should be appreciated that there can be multiple flows per service crossing any given network component. Furthermore, multiple services can be supported by a single slice. For example there can be Service X with a $QoS_1$ requirement and a Service Y with a $QoS_2$ requirement each sharing a slice. Each DM 108a, 108b and 108c receives the performance reports and aggregates 540 them before sending DM performance reports 545a, 545b and 545c to the SOM 106. The aggregation step 540 is configurable and aggregates the EM performance reports (which are received from each EM on a per EM basis) to report on a per domain basis. In other words, each DM aggregates the performance reports from each EM and reports on a domain basis. While each domain manager reports on a domain basis, the underlying basis for doing so is configurable. Accordingly each DM can transmit performance reports aggregated on one of the following basis, for its entire domain:
 a per service basis;
 a per QoS level basis;
 a per slice basis;
 a per service basis for each of a plurality of QoS levels;
 a per slice basis for each of a plurality of QoS levels;
 a per service-per slice basis; and
 a per service-per slice basis for each of a plurality of QoS levels As but one example, $DM_3$ 108c is shown to include network components allocated to two slices 110, 210 in FIG. 2. Accordingly $DM_3$ 108c receives reports from all of the EMs which manage the network components within the portions 110c and 210c. For example, as part of step 540, $DM_3$ 108c can determine service differentiated aggregations for each service in a slice, and can send such a report for the entire domain. If there is more than one slice, $DM_3$ 108c can send such a report (e.g., a service differentiated aggregation report for the entire domain) on a per slice basis to each of SOMs 106, 206. Each SOM receives the information relevant to the services facilitated by the slices managed by that SOM. For example, $DM_3$ 108c can aggregate on a service basis for the entire domain, but segregate such aggregations on a slice basis so that each SOM only receives domain wide reports pertaining to the slice or slices managed by the SOM. This is just an example, and $DM_3$ 108c can send reports on each of the bases set out above.

In some embodiments, a DM can utilize resources from another domain. For example, in some cases a domain (e.g., domain A) may have insufficient resources to satisfy a request, or may have a temporary shortage of resources to satisfy demand. In some embodiments, domain A can use the resources of another domain (e.g., domain B). In which case the DMs may report performance on a domain basis (e.g. aggregated for the domain) in addition to per flow, per session, per service or per slice basis; e.g., a DM for domain B can report performance data aggregated for all the services provided to Domain A. This can allow for domain B to charge domain A for the resources used for all the services provided using that domain.

The SOM 106 receives the DM performance reports 545a, 545b and 545c and aggregates 550 the data for the entire slice (which SOM 106 manages). NN 104 can then transmit a NM performance report 560 aggregated on a per service-per slice basis to the customer 146 of the slice. In some embodiments NN 104 can then transmit a NM performance report 560 aggregated on a per service-per slice basis for each slice requested by the customer 146. If the customer 146 has only requested a single slice, the NN 104 can transmit a NM performance report 560 aggregated on a per service basis for the entire (single) slice. In some embodiments, the NN 104 can transmit a NM performance report 560 aggregated on a per service-per slice basis aggregated over at least one of:
 per service class; and
 per slice type.

Aggregation step 550 is shown in FIG. 5 to span the SOM 106 and the NM 104 as these two elements can be integrated, or the customer 146 may only have requested a single slice.

Figure 6:
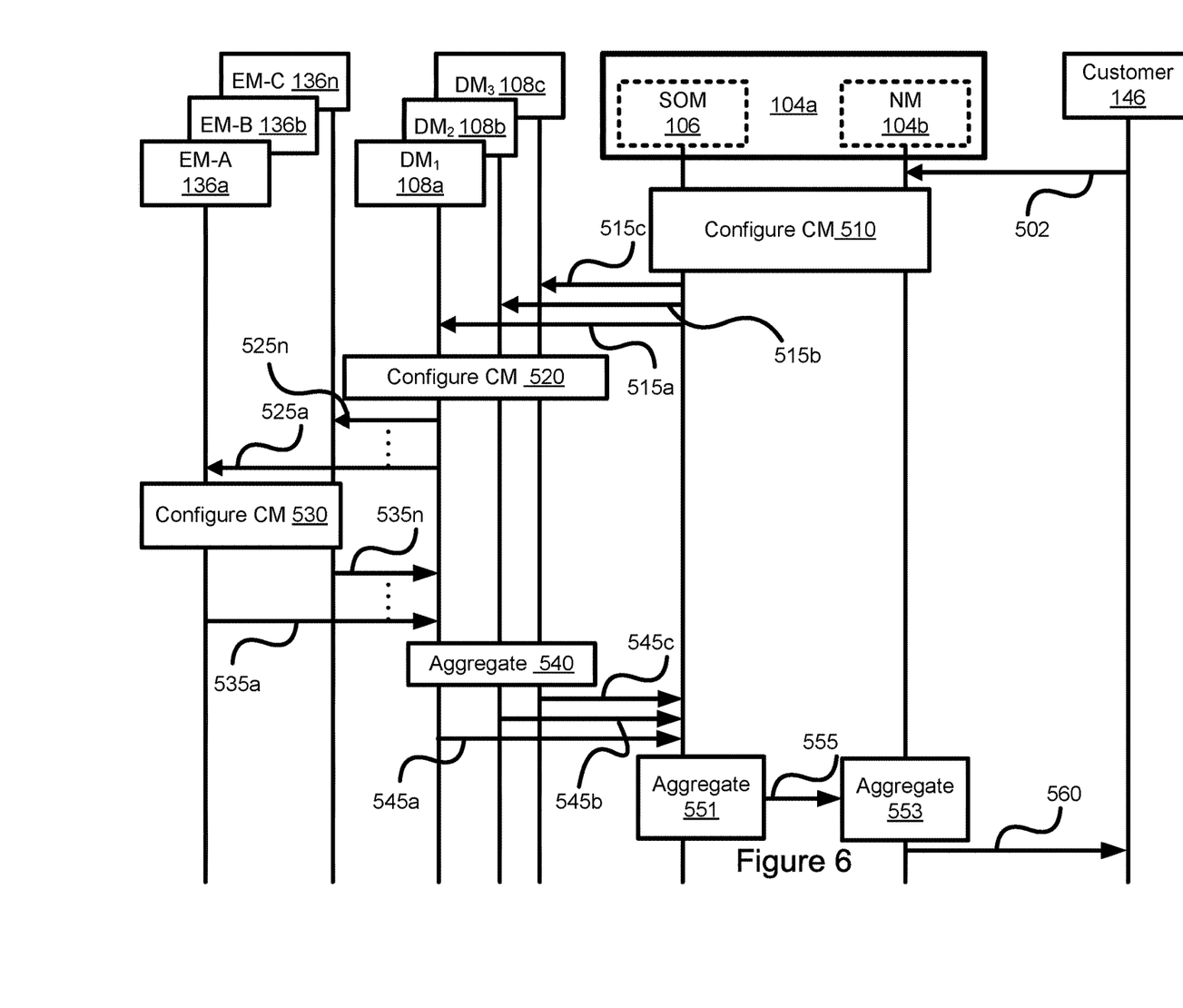
FIG. 6 is a call flow illustrating another method according to another embodiment.

FIG. 6 is similar to FIG. 5, but illustrates an example applicable for when the NM supports more than one slice. However while only a single SOM 106 is illustrated, it should be appreciated that there can be additional SOMs. Furthermore FIG. 6 illustrates a NM component 104b, which can optionally be an NM function within NM block 104a (which integrates the SOMs and NM functions) or NM 104b can be a separate function distinct from the SOM 106. In some embodiments there can be a SOM for each slice, and each SOM reports to the NM 104b. In other embodiments, the slices can share a SOM function, in which case the SOM function differentiates between slices and can report separately on each slice.

In FIG. 6, SOM 106 performs an aggregation step 551 for all of the reports it receives from the DMs involved with the slice and can provide a service differentiated aggregation report 555 for the entire slice to the NM 104. If the customer has requested more than one slice, the NM 104 would aggregate 553 reports it receives from each SOM (only SOM 106 is shown, but there would be an SOM function for each slice, unless the SOM is configured to operate a plurality of slices) to report 560 to the customer 146 for all services and all slices requested by the customer 146. It should be appreciated that the NM 104 can report on various bases as requested by the customer 146. For example, Accordingly NM 104 can transmit performance aggregated on one of the following basis to the customer:
 a per service basis;
 a per QoS level basis;
 a per slice basis;
 a per service basis for each of a plurality of QoS levels;
 a per domain basis;
 a per slice basis for each of a plurality of QoS levels;
 a per service-per slice basis; and
 a per service-per slice basis for each of a plurality of QoS levels As stated above, multiplexing gains can occur when resources are shared. Resources can be shared between slices or services. In addition, resources of a particular domain may be shared with other domains. Due to the multiplexing gain, aggregated service resource usage can be different from a simple addition of resource usage of individual services. For example a domain can allocate a network component to two different slices. In other words, the network component is shared between two slices, or in some embodiments between two subnetwork slices. Such a sharing can result in a multiplexing gain.

In an aspect of the present invention, there is provided a method of performance monitoring that can be carried out by a slice operations manager. The SOM can be associated with a plurality of domain managers, each of which is associated with a network domain. The method may comprise receiving performance data from a plurality of domain managers; and transmitting performance data on an aggregated basis to a network manager which is associated with the plurality of domains, the performance data aggregated for the slice managed by the slice operations manager.

In an embodiment, transmitting performance data on an aggregated basis comprises transmitting service differentiated aggregations such that the performance is aggregated on a service basis for the entire slice.

In another aspect of the present invention, there is provide a slice operations manager that comprises a memory, a network interface and a processor that carries out the above method.

In one of a plurality of aspects of the present invention, there is provided a method of performance monitoring. This method may be executed by a network manager and comprise receiving a request from a network customer for a virtual network service; configuring a slice operations manager to operate a slice to provide the virtual network service; receiving performance data from the slice operations manager regarding performance of the slice; and transmitting performance data to the network customer regarding the performance of the virtual network service. In some embodiments the establishment of the network slice that is being monitored may be carried out by a different entity, and thus may not be performed by the network manager. In another embodiment, the network customer can request a plurality of virtual network services; the network manager can receive performance data comprises receiving performance data regarding a plurality of slices; and the network manager can transmit performance data segregated by virtual network service.

In another of the plurality of aspects of the present invention, there may be provided a network manager comprising a network interface, a memory and a processor for carrying out the methods discussed above.

In another of the plurality of aspects of the present invention, there may be provided a method of performance management that can be carried out at an element manager. The element manager can receive performance data from a network component (or a plurality of network components) with which it is associated. The element manager can then transmit aggregated performance data towards a domain manager. The transmitted performance data can be aggregated on at least one of a per flow basis, a per service basis, a QoS basis, and a per slice basis.

In another of the plurality of aspects of the present invention there may be provided an element manager comprising a network interface, a memory and a processor for carrying out the methods discussed above.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A method for execution by a domain manager associated with a domain within a network, the method comprising:
   receiving, at the domain manager, from a plurality of network components within the domain, performance data associated with a plurality of virtual network services, the domain manager in direct communication with the plurality of network components; and
   transmitting, from the domain manager, aggregated performance data comprising service differentiated performance data aggregated over the flows associated with each virtual network service, such that the performance data is aggregated on a per service class per virtual network service basis for the entire domain;
   wherein the domain supports a plurality of slices, each slice managed by a slice operations manner, and wherein transmitting aggregated performance data comprises transmitting service differentiated aggregations on a service basis but aggregated on a slice basis to each slice operations manager.

2. The method of claim 1 wherein transmitting aggregated performance data comprises transmitting performance data further aggregated on one of:
   a per QoS level basis;
   a per slice basis;
   a per service class basis for each of a plurality of QoS levels;
   a per slice basis for each of a plurality of QoS levels;
   a per service class-per slice basis; and
   a per service class-per slice basis for each of a plurality of QoS levels.

3. The method of claim 2, wherein the per slice bases is determined via a slice identifier.

4. The method of claim 2, wherein the per service bases is determined via a service identifier.

5. The method of claim 1 wherein the domain manager utilizes resources from another domain and transmitting performance data on an aggregated basis comprises transmitting performance aggregated on a per domain basis.

6. The method of claim 1 wherein the method further comprises receiving, from the network manager, configuration commands for configuring resources.

7. The method of claim 6 wherein the configuration commands instruct the configuration of a configuration manager for allocating resources.

8. The method of claim 6 wherein the configuration manager associated with the domain manager sends instructions to element managers for configuring configuration managers associated with each element manager for allocating resources.

9. The method of claim 6 wherein the configuration commands specifies at least one of:
   a VN service ID for identifying flows belong to each VN service; and
   a slice ID for identifying flows belong to each slice.

10. The method of claim 1 wherein the domain manager supports a plurality of slices and the method further comprises sharing resources from one slice to another.

11. The method of claim 10 wherein transmitting aggregated performance data comprises reporting multiplexing gains obtained from the sharing of resources.

12. The method of claim 11 wherein aggregated performance data comprises transmitting aggregated service resource usage which differs from a simple addition of resource usage of individual flows due to multiplexing gain.

13. The method of claim 1 wherein transmitting comprises transmitting service differentiated aggregations for a slice to a slice operations manager responsible for operation of the slice.

14. The method of claim 13 wherein transmitting aggregated performance data comprises transmitting performance aggregated on a per virtual network service-per slice basis aggregated over at least one of:
   per service class; and
   per slice type.

15. The method of claim 1 wherein the network components comprises at least one of subnetworks, data storages, network elements, physical network functions and virtual network functions.

16. The method of claim 1 wherein receiving performance data from a plurality of network components comprises receiving performance data from a plurality of element managers which manage the network components.

17. The method of claim 1 wherein receiving performance data from a plurality of network components comprises receiving performance data on at least one of:
   a per flow basis;
   a per service class basis;
   a VN service basis;
   a QoS basis; and
   a slice basis.

18. The method of claim 1 wherein performance data specifies, for each flow, at least one of a VN service ID and a slice ID.

19. The method of claim 1 wherein the performance data is aggregated on a per service class per virtual network service basis comprises aggregating the performance data on a per service class for traffic flows having a common characteristic.

20. The method of claim 19 wherein the common characteristic comprises at least one of: a QoS class, a range of QoS levels, and a common application.

21. A domain manager comprising:
   at least one network interface;
   a processor; and
   machine readable memory storing machine readable instructions which when executed by the processor causes the domain manager to:
      receive performance data on a per flow basis from a plurality of network components within a domain for which the domain manager is responsible, the domain manager in direct communication with the plurality of network components; and
      transmit virtual network service performance data on an aggregated basis to a network manager which is associated with the plurality of domains, the virtual network service performance data aggregated on a per-service class for each virtual network service for the domain:
      wherein the domain manager receives performance data associated with a plurality of virtual network services; and the instructions causes the domain manager to transmit service differentiated aggregations such that the performance is aggregated on a virtual network service basis for the entire domain.

22. The domain manager of claim 21 in which the domain supports a plurality of slices, each slice managed by a slice operations manager, and wherein the instructions cause the domain manager to transmit service differentiated aggregations on a virtual network service basis but segregated on a slice basis to each slice operations manager.

23. The domain manager of claim 22 wherein the service differentiated aggregations reports performance on a per service class basis for each of a plurality of QoS levels.

24. The domain manager of claim 21 wherein the instructions cause the domain manger to transmit performance data on an aggregated basis aggregated on one of:
   a per service class basis;
   a per QoS level basis;
   a per slice basis;
   a per service class_basis for each of a plurality of QoS levels;
   a per slice basis for each of a plurality of QoS levels;
   a per service-per slice basis; and
   a per service-per slice basis for each of a plurality of QoS levels.

* * * * *